(12) United States Patent  (10) Patent No.: US 8,413,611 B2
Axelrod  (45) Date of Patent: Apr. 9, 2013

(54) RUBBER-FIBER HYBRID

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 558 days.

(21) Appl. No.: 12/339,973

(22) Filed: Dec. 19, 2008

(65) Prior Publication Data

US 2009/0101079 A1    Apr. 23, 2009

Related U.S. Application Data

(63) Continuation of application No. 11/104,296, filed on Apr. 12, 2005, now abandoned.

(51) Int. Cl.
*A01K 29/00* (2006.01)
(52) U.S. Cl. ........................................... 119/709
(58) Field of Classification Search ................. 119/709, 119/707, 710, 711, 702
See application file for complete search history.

(56) References Cited

U.S. PATENT DOCUMENTS

| | | | |
|---|---|---|---|
| 1,149,170 A | 8/1915 | Allis | |
| 2,185,547 A | 1/1940 | Fowler | |
| 4,364,925 A | 12/1982 | Fisher | |
| 4,375,886 A | 3/1983 | Muys | |
| 4,771,733 A | 9/1988 | Axelrod | |
| 5,092,272 A | 3/1992 | O'Rourke | |
| D327,962 S | 7/1992 | O'Rourke | |
| D328,805 S | 8/1992 | O'Rourke | |
| 5,148,770 A | 9/1992 | O'Rourke | |
| D330,614 S | 10/1992 | O'Rourke | |
| 5,174,243 A | 12/1992 | O'Rourke | |
| D343,930 S | 2/1994 | Garcia | |
| D346,048 S | 4/1994 | Jandebeur et al. | |
| D348,547 S | 7/1994 | O'Rourke | |
| D348,959 S | 7/1994 | Lawson | |
| 5,329,881 A | 7/1994 | O'Rourke | |
| 5,339,771 A | 8/1994 | Axelrod | |
| 5,392,734 A | 2/1995 | Laone et al. | |
| 5,467,741 A | 11/1995 | O'Rourke | |
| 5,560,320 A | 10/1996 | Plunk | |
| D378,450 S | 3/1997 | O'Rourke et al. | |
| 5,711,254 A | 1/1998 | O'Rourke | |
| 5,713,307 A | 2/1998 | Polston et al. | |
| 6,050,224 A | 4/2000 | Owens | |
| 6,148,771 A | 11/2000 | Costello | |
| 6,240,879 B1 | 6/2001 | Denesuk et al. | |
| 6,277,773 B1 * | 8/2001 | Ward et al. ................ | 442/409 |
| 6,283,063 B1 | 9/2001 | Zalevsky | |
| 6,360,693 B1 | 3/2002 | Long, III | |
| 6,360,694 B1 | 3/2002 | Noto | |
| 6,672,252 B2 | 1/2004 | Levin | |

OTHER PUBLICATIONS

Spectra fiber 900 [online], [retrieved on Dec. 29, 2004] Retrieved from Honeywell Advanced Fibers and Composites using Internet <URL:. http://www.honeywell.comfsites/sm/afc/spectrafiber.htm>. (4 pages).

(Continued)

*Primary Examiner* — Son T Nguyen

(74) *Attorney, Agent, or Firm* — Grossman, Tucker, Perreault & Pfleger, PLLC

(57) ABSTRACT

An animal chew toy and a method for making such that comprises a fabric having a plurality of fibers and a polymeric material that contacts the fabric wherein the polymer material engages with the plurality of fibers.

7 Claims, 4 Drawing Sheets

OTHER PUBLICATIONS

International Preliminary Report on Patentability issued in related International Patent Application No. PCT/US06/13583 dated Mar. 10, 2009.

International Search Report and Written Opinion issued in related International Patent Application No. PCT/US06/13583 dated Jun. 17, 2008.

* cited by examiner

RUBBER-FIBER HYBRID

CROSS REFERENCE TO RELATED APPLICATION

This application is a continuation of U.S. application Ser. No. 11/104,296, filed on Apr. 12, 2005, the teachings of which are incorporated herein by reference.

FIELD OF THE INVENTION

The present invention relates to dog chews composed of fabric and a polymeric material. More particularly, the present invention relates to dog chews composed of fabric and polymeric material where the polymeric material may be over-molded onto the fabric.

BACKGROUND

There are a variety of chew toys available that serve the individual, as well as the combined purposes of entertaining a dog and non-invasively cleaning an animal's teeth. Animals are subject to a variety of dental problems. Often it is difficult to treat these dental problems through traditional methods, such as brushing, and a number of chew toys have been developed to treat dental problems by providing toys that create sufficient interest through entertainment, or other means, to get the animal to chew upon the toy. Providing an animal with chew toys also helps to develop the teeth and jaw of an animal and satiates the animal's desire to chew.

Examples of chew toys include but are not limited to the following. U.S. Pat. No. 6,360,693 discloses an apparatus for use as a toy by an animal that resembles a branch in appearance. U.S. Pat. No. 6,148,771 reports a chew article of elastomeric material having an outer surface with a number of groves. Furthermore, there is an interior cavity into which edible material can be held and released in a controlled manner while using the chew article. U.S. Pat. No. 5,339,771 discusses a chew toy molded from synthetic plastic. Animal meal is dispersed through out the synthetic plastic. U.S. Pat. No. 4,771,733 describes a chewable object or toy formed of a polyurethane resin with an aqueous based flavor or odor incorporated therein. These examples may provide, among other features, hard surfaces which reportedly help to provide dental prophylaxis.

Furthermore, numerous devices have been developed that use fiber or fibrous materials. Reportedly, the fibrous material also aid in improving the dental hygiene of pets by cleaning between the animal's teeth when chewed upon. Examples of such devices include, but are not limited to the following. U.S. Pat. No. 6,672,252 discloses a chew that comprises a ductile material that holds inclusions. The inclusions may contain fibers, hard components and mixtures thereof. The inclusions work in conjunction with the ductile substrate material to perform as a tooth-cleaning component or components. U.S. Pat. No. 5,174,243 discloses a chew toy that comprises a shaft portion and a pair of knuckle or end members. The knuckle or end members define recessed areas adapted to receive the ends of the shaft portion. U.S. Pat. No. 5,148,770 discloses a chew toy comprised of a pair of cattle hooves and a length of flexible cotton rope secured to and extending between the cattle hooves.

As can be seen from the above, several variations of animal chews have been developed utilizing fiber combinations with polymers or animal by-products. However, a need remains to advance the design of the prior art products to improve the efficiency of a given chew toy and its method of manufacture to enhance the dental hygiene and entertainment requirements of the animal.

There is therefore a need in the pet chew field for a pet chew toy that provides both entertainment and dental hygiene having both polymer material and fibrous portions that may be more efficiently combined in a single chew toy. It is an object of the present invention to provide an animal chew and a method to form an animal chew in which a fabric material may be over-molded resulting in a chew product having both polymer material and fabric portions.

SUMMARY

One aspect of the present invention relates to an animal chew toy comprising a fabric having a plurality of fibers, providing one or a plurality of void spaces between the fibers, and a polymer material engaged to the fibers. The polymer material may be located within one or a plurality of the fiber void spaces and mechanically engaged to the fibers.

Another aspect of the present invention relates to a method for making an animal chew toy comprising providing a fabric; providing a polymer material; and providing a mold having a cavity. The fabric may be located in the mold; and polymer material may be introduced into the mold and into contact with the fabric. The polymer material may mechanically engage the fabric.

Another aspect of the present invention relates to an animal chew toy comprising a fabric having a plurality of fibers, providing one or a plurality of void spaces between the fibers, and a polymer material engaged to the fibers. The polymer material may be located within one or a plurality of the fiber void spaces and may chemically engage to the fibers.

BRIEF DESCRIPTION OF THE DRAWINGS

Features and advantages of the present invention are set forth herein by description of embodiments consistent with the present invention, which description should be considered in conjunction with the accompanying drawings, wherein.

DETAILED DESCRIPTION

The present invention relates to dog chews of a fibrous or fabric material and a polymer material. More particularly, the present invention relates to dog chews that may be composed of fabric and a polymeric material where the polymeric material may be combined with the fabric or fibrous material.

Figure 1:
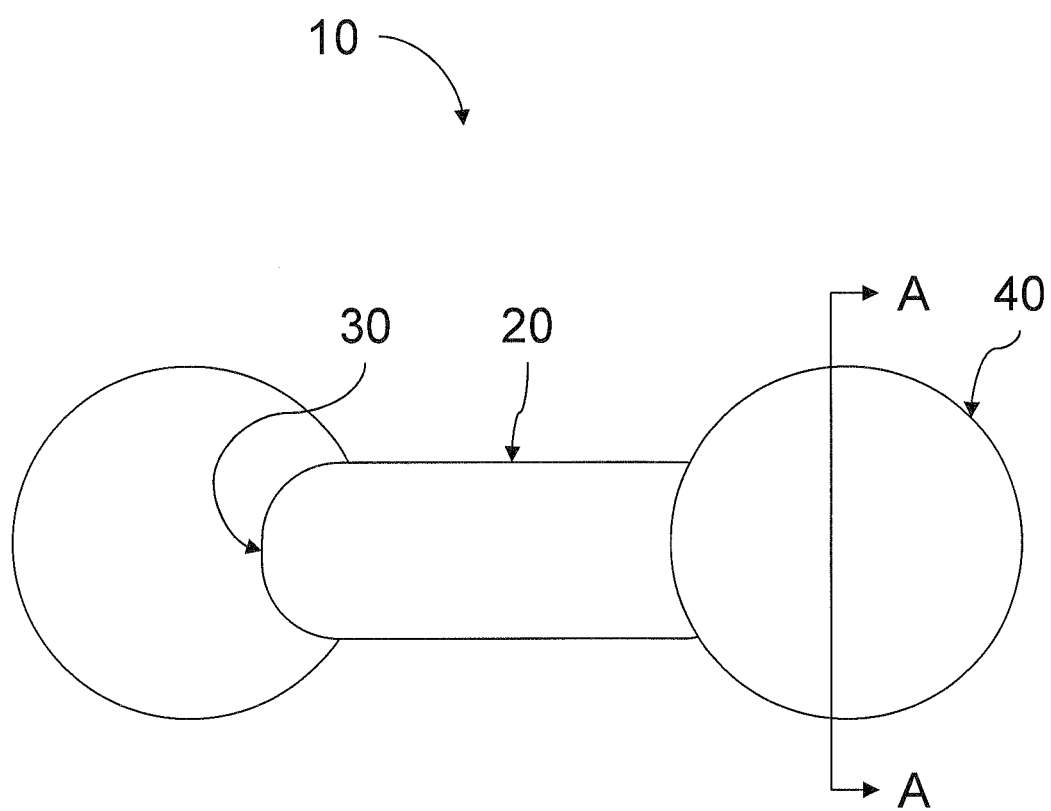
FIG. 1 is a perspective view of an embodiment of the present invention.

In one embodiment of the present invention, a polymeric material may be over-molded onto a fabric. Preferably, the polymeric material may be over-molded onto the end portions of the fabric. FIG. 1 illustrates an example of an embodiment of the present invention in which an animal chew 10 comprises a fabric having a length 20 and an end portion 30. A polymer material 40, which may preferably be an elastomeric or flexible material, is over-molded onto the end portion 30 of said length. However, the polymer material may also be over-molded between the end portions 30 of the fabric.

Figure 2:
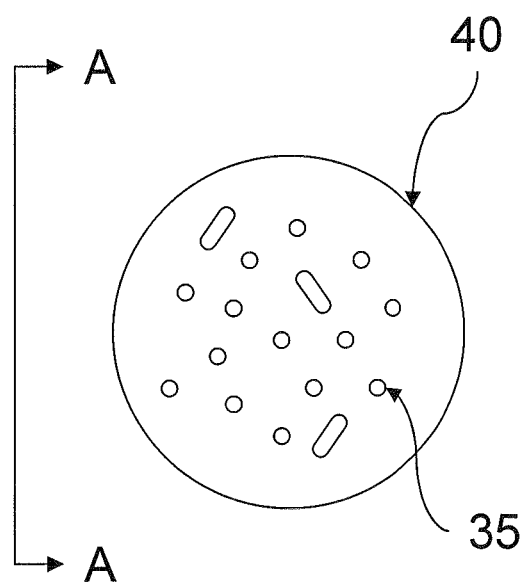
FIG. 2 is a cross-sectional view of an embodiment in FIG. 1 at A-A.

FIG. 2 shows a cross section of FIG. 1 at section A-A, which allows a view of the internal portion of the over-molded section. As can be seen, fibers 35 are preferably surrounded and embedded within the over-molded polymer resin 40. In addition, while the fibers are illustrated as generally parallel and discrete, it can be appreciated that the fibers may be non-discrete and randomly dispersed within the over-molded region, as may be desired.

Figure 3:
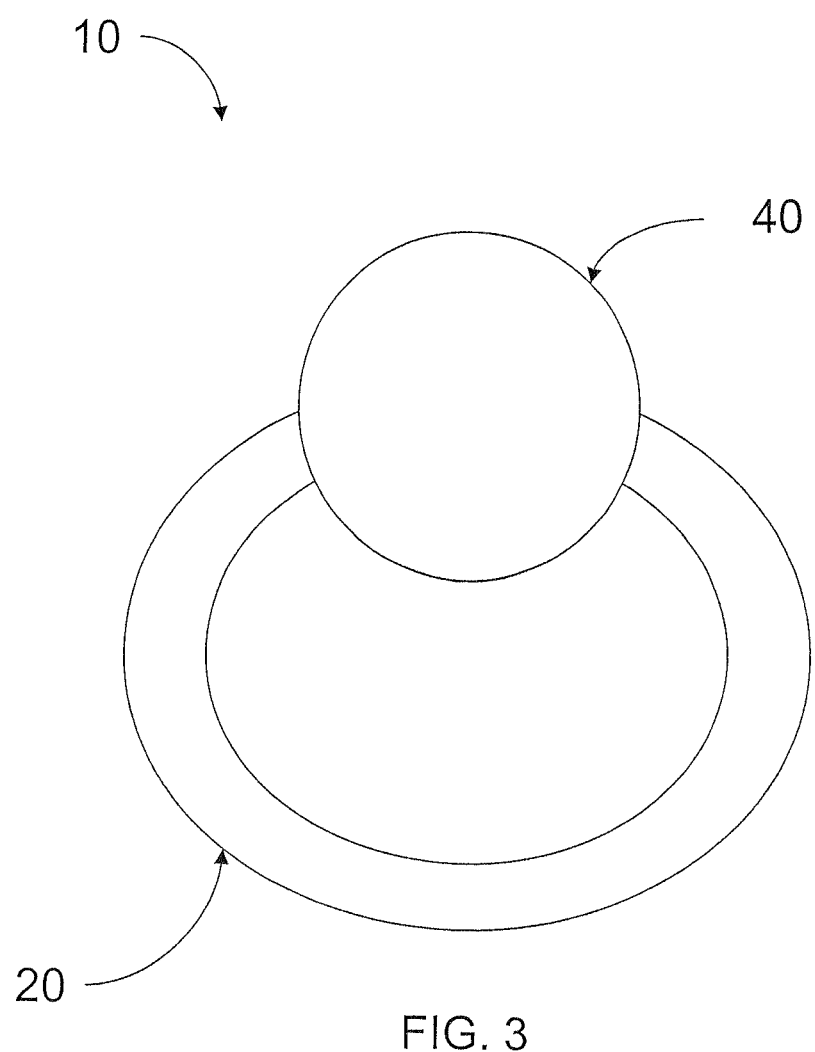
FIG. 3 is a perspective view of another embodiment of the present invention.

In another embodiment, the polymer material may be over-molded onto a fabric to join the free ends of the fabric to form a ring or other desired configuration. Turning to FIG. 3, an animal chew 10 comprises a fabric having a length 20, with two free ends (not shown) and a polymeric material 40 is over-molded onto said free ends to secure the free ends within the polymer material 40.

Figure 4:
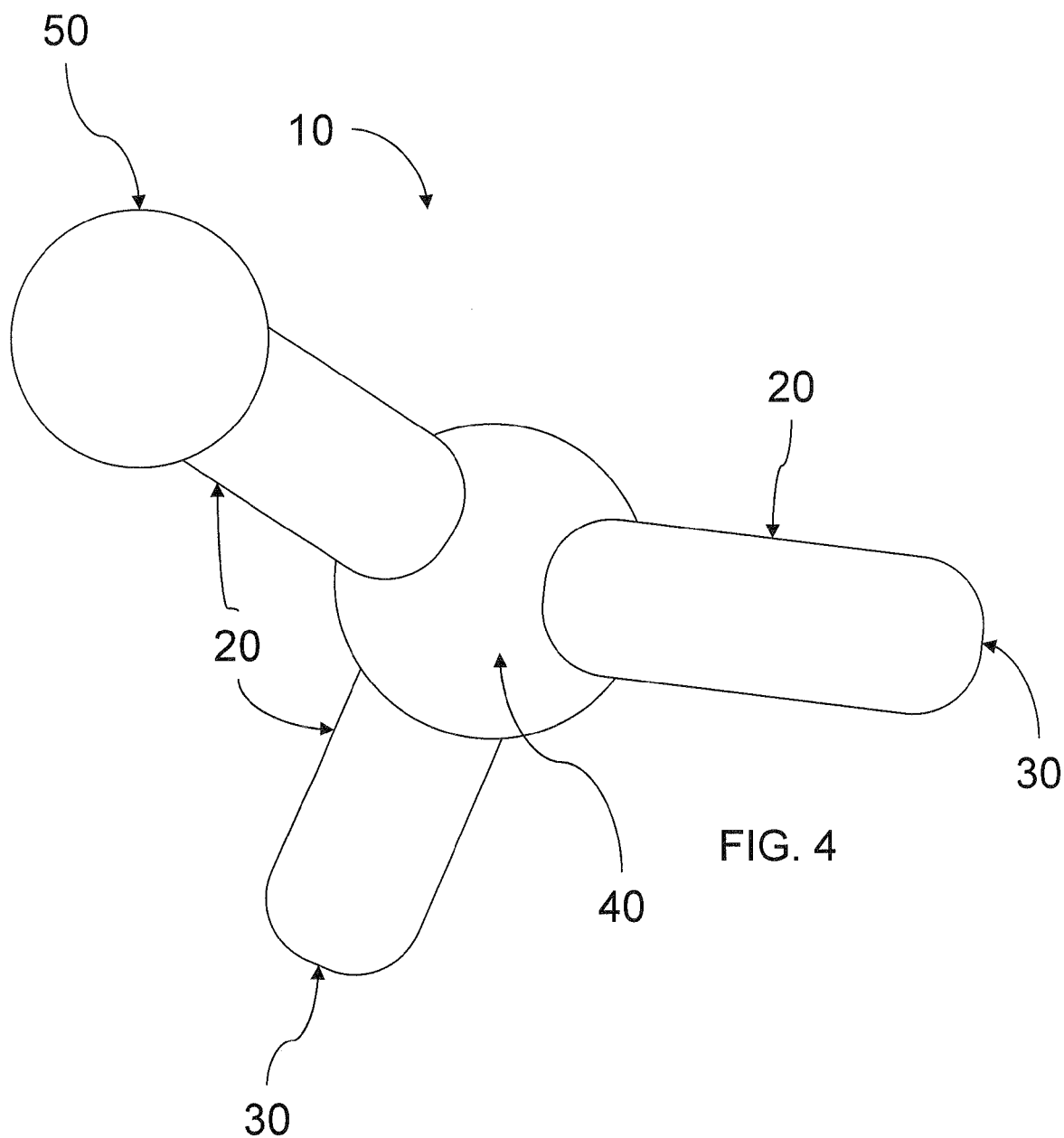
FIG. 4 is a perspective view of another embodiment of the present invention.

In another embodiment, the toy may comprise a number of fabric shafts such as illustrated in FIG. 4 depicting an animal chew 10 comprising multiple fabric lengths 20 having end portions 30, of which one of the end portions may be embedded within the polymeric material 40. As illustrated, the end portions may remain free at one end, or be embedded in polymer material as is shown at 50. In addition, it can be appreciated that the polymeric resin need not be limited to over-molded at the end portions 30, and may be over-molded anywhere along the length of fabric 20 as may be desired. In this manner, one can assemble unique configurations of animal chew toys, with one or a plurality of connection points between fabric and polymer resin, wherein such connection points amount to an over-molded region of polymer resin and fabric.

In one embodiment of the present invention, the fabric may comprise a woven, non-woven, spun bond, or any fibrous polymeric material. That is, the fabric may be formed of any polymeric material that may be fiber forming. The fabric may therefore be, e.g. a canvas material. The fibers may also be composed of aramid fibers (e.g. KEVLAR™), acrylic fibers, modacrylics, polyamide fibers, olefin fibers, polyethylene fibers naphthalate fibers, polyester fibers (PET), or combinations thereof. More preferably, the fibers may be composed of extended chain and orientated polyethylene fibers (e.g., Honeywell's "SPECTRA™" polyethylene fiber material). Such oriented polyethylene fiber is reportedly based upon relatively high molecular weight polyethylene sourced from a gel-spinning process, thereby producing polyethylene fibers with a melting point of about 150° C. Such fibers are, e.g., characterized as having an ultimate tensile strength of about 2.1 GPa and higher, a modulus of about 60 GPa and higher and a density of about 0.97 g/cc. Accordingly, such fibers are lightweight and can float, and have good resistance to abrasion. In preferred embodiment, the SPECTRA™ fibers herein may utilize SPECTRA 900, SPECTRA 1000 or SPECTRA 2000.

The polymer material herein may be any polymer resin that can be caused to flow and engage with the fiber material. Accordingly, any thermoplastic resin may be employed, which would include polyolefins, nylons, polyesters, polyacetals, polyurethanes, thermoplastic olefin elastomers, ABS, etc. In addition, certain thermoset formulations may be considered which can be molded onto said fiber material, followed by a chemical crosslinking reaction to cause the thermoset to solidify. Such may include, e.g., polyurethane resins, crosslinked polyesters, and epoxy based polymers. Accordingly, the thermoset material may be chemically engaged to the fiber material. In curing of the thermoset polymer formulations, chemical bonding may occur between the resin and the fiber material.

In addition, preferably, the polymer material may be an elastomeric material, which is understood herein as a material that is capable of 50% elongation with substantial recovery (50-100%). Preferably, the elastomeric material may be a polyurethane elastomer, natural or synthetic rubber, a styrene block copolymer rubber, such as KRATON™, or synthetic diene elastomers.

It should be appreciated that apart from the shaped noted above, various shapes can be over-molded onto the fabric. That is, while the illustrated embodiment depicts a spherical shape molded over the fabric, other shapes including knuckles, hemispheres, cones, cylinders, squares, spheres having projections from the surfaces thereof, cylinders having groves molded into the surface thereof, etc. may be molded onto the fabric or fibrous material. Furthermore, the shapes that can be over-molded need not be of a unitary size, and can be made to vary is size as desired.

In one embodiment, the fabric may be composed of a plurality of fibers. Between the plurality of fibers in the fabric a number of void spaces may be present. Upon the introduction of the polymeric material to the fabric, which is defined herein as "overmolding", the polymeric material may locate within the void spaces. In another embodiment, the polymeric material may mechanically engage with the fibers. By mechanical engagement, it is contemplated that there can be surface to surface contact between the polymer material and one or more of the fibers, such that the polymer material may simply adhere to one or more of the fibers. Alternatively, mechanical engagement may be such that the polymer material may surround one or more of the fibers. It should be appreciated therefore that various degrees of mechanical engagement may occur along the cross section of any given fabric.

Preferably, the polymer material may be melted and over-molded using any melt processing technique. One skilled in the art would recognize that melt processing may include extrusion, injection molding, compression molding, etc. wherein the polymeric material is in a melt or substantially liquid state prior to forming. In one preferred embodiment, the polymeric material may be injection molded onto the fabric. Preferably, the fabric may be placed into the mold cavity and located at any desired position in the mold cavity prior to injecting a portion of material onto the fabric. More preferably, the polymer material may flow into the fabric, wherein the polymer material, upon cooling, engages with the fabric and becomes attached thereto. Preferably, the attachment may include the polymer material surrounding various fibers and mechanically interlocking within a given fiber network.

The foregoing description is provided to illustrate and explain the present invention. However, the description hereinabove should not be considered to limit the scope of the invention set forth in the claims appended here to.

What is claimed is:

1. An animal chew toy comprising:
    a woven or non-woven fabric shaft having a plurality of fibers, said fabric shaft having a length and end portions, wherein one or a plurality of void spaces are located between said plurality of fibers; and
    an over-molded polymer material portion, wherein said over-molded polymer material portion comprises a polymer resin and said over-molded polymer material portion is located only at the end portion of said length of said fabric shaft and within said one or a plurality of fiber void spaces and is mechanically engaged to said fibers, further characterized in that said over-molded polymer surrounds one or more of said fibers at said end portions, wherein said fabric shaft is selected from the group consisting of oriented polyethylene fiber and poly-paraphenylene terephthalamide fiber having an ultimate tensile strength of 2.1 GPa and higher.

2. The animal chew of claim 1 wherein said fabric shaft has one or a plurality of end portions, and said polymer material portion engaged to said fibers is located at said one or plurality of end portions.

3. The animal chew of claim 1 wherein said polymer resin is a thermoplastic material.

4. The animal chew of claim 1 wherein said polymer resin is an elastomeric material.

5. The animal chew toy of claim 1 wherein said over-molded polymer material portion is a molded shape selected from the group consisting of a sphere, a hemisphere, a cylinder, a prism, a cone, knuckles and combinations there of.

6. An animal chew toy comprising:
a woven or non-woven fabric shaft having a plurality of fibers, said fabric shaft having a length and end portions, wherein one or a plurality of void spaces are located between said plurality of fibers, and
an over-molded polymer material portion wherein said over-molded polymer portion comprises a polymer resin and said over-molded polymer material portion is located only at the end portions of said length of said fabric shaft and within said one or a plurality of fiber void spaces and is chemically engaged to said fibers,
further characterized in that said over-molded polymer surrounds one or more of said fibers at said end portions,
wherein said fabric shaft is selected from the group consisting of oriented polyethylene fiber and poly-paraphenylene terephthalamide fiber having an ultimate tensile strength of 2.1 GPa and higher.

7. The animal chew toy of claim 6 wherein said polymer resin is a thermoset material.

* * * * *